United States Patent
Matsui et al.

(10) Patent No.: US 11,001,148 B2
(45) Date of Patent: May 11, 2021

(54) MOTOR CONTROL DEVICE

(71) Applicant: HITACHI AUTOMOTIVE SYSTEMS, LTD., Ibaraki (JP)

(72) Inventors: Hirokazu Matsui, Hitachinaka (JP); Atsushi Komuro, Hitachinaka (JP); Kohei Myoen, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/483,000

(22) PCT Filed: Jan. 18, 2018

(86) PCT No.: PCT/JP2018/001330
§ 371 (c)(1),
(2) Date: Aug. 1, 2019

(87) PCT Pub. No.: WO2018/142952
PCT Pub. Date: Aug. 9, 2018

(65) Prior Publication Data
US 2020/0021220 A1    Jan. 16, 2020

(30) Foreign Application Priority Data
Feb. 2, 2017 (JP) .............................. JP2017-017341

(51) Int. Cl.
*B60L 3/00*        (2019.01)
*H02P 21/16*       (2016.01)
(Continued)

(52) U.S. Cl.
CPC ............... *B60L 3/00* (2013.01); *H02P 21/16* (2016.02); *H02P 21/22* (2016.02); *H02P 27/12* (2013.01); *B60L 3/04* (2013.01); *B60Y 2200/91* (2013.01)

(58) Field of Classification Search
CPC .... H02P 25/24; H02P 6/08; H02P 9/00; H02P 23/00; H02P 7/18; B60L 15/20; B60W 20/00; H02K 13/06; H02K 29/08
See application file for complete search history.

(56) References Cited

U.S. PATENT DOCUMENTS 6,041,605 A     3/2000 Heinrichs
2002/0024221 A1  2/2002 Grewe et al.
(Continued)

FOREIGN PATENT DOCUMENTS

JP    2000-134990 A    5/2000
JP    2012-147614 A    8/2012
(Continued)

OTHER PUBLICATIONS

International Search Report dated Apr. 24, 2018 for the PCT International Application No. PCT/JP2018/001330.

*Primary Examiner* — Said Bouziane
(74) *Attorney, Agent, or Firm* — Volpe Koenig

(57) ABSTRACT

To appropriately limit a current output from an inverter to a motor according to a state of a cooling mechanism that cools the motor and the inverter. A motor control unit includes a current command unit configured to calculate current command values (Id*, Iq*) for determining a current to be output to a motor on the basis of an input torque command, a motor lock determination unit configured to determine whether the motor is in a locked state on the basis of a motor rotation speed Nrpm indicating a rotation state of the motor, and a torque command limitation unit configured to limit the current to be output to the motor by limiting the torque command on the basis of a cooling water temperature Tc indicating a state of the cooling mechanism in a case where the motor lock determination unit determines that the motor is in the locked state.

7 Claims, 15 Drawing Sheets

(51) Int. Cl.
    *H02P 21/22*     (2016.01)
    *H02P 27/12*     (2006.01)
    *B60L 3/04*     (2006.01)

(56) References Cited

U.S. PATENT DOCUMENTS

| | | | |
|---|---|---|---|
| 2002/0116100 A1* | 8/2002 | Shimazaki | B60L 50/60 701/22 |
| 2012/0185143 A1 | 7/2012 | Ohno | |
| 2013/0088179 A1 | 4/2013 | Kobayashi et al. | |
| 2017/0203670 A1* | 7/2017 | Morinaga | B60L 3/003 |
| 2018/0079311 A1 | 3/2018 | Ichikawa et al. | |

FOREIGN PATENT DOCUMENTS

| | | | |
|---|---|---|---|
| JP | 2013-085377 A | 5/2013 |
| JP | 2013-127411 A | 6/2013 |
| JP | 2016-185050 A | 10/2016 |
| JP | 2016-195515 A | 11/2016 |
| WO | 2016/013063 A1 | 1/2016 |

* cited by examiner

FIG. 2

| COOLING WATER TEMPERATURE [degC] | MOTOR CONTINUOUS ENERGIZABLE TORQUE [Nm] |
|---|---|
| 15 | 60 |
| 25 | 55 |
| 35 | 50 |
| 45 | 46 |
| 55 | 43 |
| 65 | 40 |

FIG. 3

| MOTOR TEMPERATURE [degC] | PROTECTION START MOTOR TEMPERATURE [degC] |
|---|---|
| 40 | 61 |
| 60 | 73 |
| 80 | 87 |
| 100 | 103 |
| 110 | 112 |
| 120 | 122 |
| 130 | 132 |
| 140 | 140 |

FIG. 4

| MOTOR TEMPERATURE [degC] | LOCK DETECTION-TIME TORQUE LIMITATION VALUE [Nm] |
|---|---|
| 100 | 120 |
| 110 | 110 |
| 120 | 90 |
| 130 | 60 |
| 140 | 40 |

FIG. 9

| COOLING WATER TEMPERATURE [degC] | INVERTER CONTINUOUS ENERGIZABLE TORQUE [Nm] |
|---|---|
| 15 | 84 |
| 25 | 80 |
| 35 | 75 |
| 45 | 70 |
| 55 | 60 |
| 65 | 55 |

FIG. 10

| INVERTER TEMPERATURE [degC] | PROTECTION START INVERTER TEMPERATURE [degC] |
|---|---|
| 40 | 61 |
| 60 | 73 |
| 80 | 87 |
| 100 | 100 |
| 110 | 110 |
| 120 | 120 |

FIG. 11

| INVERTER TEMPERATURE [degC] | LOCK DETECTION-TIME TORQUE LIMITATION VALUE [Nm] |
|---|---|
| 80 | 120 |
| 90 | 110 |
| 100 | 90 |
| 110 | 60 |
| 120 | 40 |

MOTOR CONTROL DEVICE

TECHNICAL FIELD

The present invention relates to a motor control device.

BACKGROUND ART

Conventionally, in an electric vehicle such as an electric car using a motor as a driving force, when a wheel falls into a dent in a road, a street gully, or the like and cannot rotate, the motor cannot rotate even if a current is passed through the motor. Such a state is called "locked state". In such a locked state of the motor, when a large torque demand is input to an inverter by a user pressing down on an accelerator to perform driving instruction operation of the motor or the like, there is a possibility that a high current flows into a coil of a specific phase in a concentrative manner out of coils of a U phase, a V phase, and a W phase arranged in a stator of a three-phase alternating current motor. If such a state continues, the coil of the specific phase and a switching element corresponding to the coil in the inverter may burn out due to overheating.

To avoid a situation in which the coil or the like of the motor burns out in the locked state as described above, a technology of reducing energization to the motor to suppress heat generation when it is detected that the motor is in the locked state is known. For example, PTL 1 describes a technology of decreasing a maximum value of drive torque to drive torque at which the coils of the respective phases inside the motor do not thermally destruct even if the motor is continuously driven at a normal ambient temperature.

CITATION LIST

Patent Literature

PTL 1: JP 2012-147614 A

SUMMARY OF INVENTION

Technical Problem

The technology described in PTL 1 is characterized that, in the case of decreasing the maximum value of the drive torque after it is determined that the motor is in the locked state, the maximum value of the drive torque is decreased to the drive torque at which the coils U, V, and W of the respective phases inside the motor do not thermally destruct even if the motor is continuously driven at the normal ambient temperature. However, when a case where the motor and the inverter are sufficiently cooled by a cooling mechanism using cooling water or the like and a case where the motor and the inverter are not sufficiently cooled are compared, the drive torque at which the motor and the inverter do not thermally destruct is not constant according to the ambient temperature. In such a case, if drive torque limitation is performed assuming the normal ambient temperature, the drive torque of the motor is excessively limited. As a result, the current output from the inverter to the motor may be excessively limited.

Solution to Problem

A motor control device according to the present invention limits a current output from an inverter to a motor on the basis of a state of a cooling mechanism that cools at least one of the motor and the inverter in a case where the motor driven by the inverter is in a locked state.

Advantageous Effects of Invention

According to the present invention, a current to be output from an inverter to a motor can be appropriately limited according to a state of a cooling mechanism that cools the motor and the inverter.

BRIEF DESCRIPTION OF DRAWINGS

FIG. 2 is a diagram illustrating an example of a relationship between a cooling water temperature and motor continuous energizable torque in the first embodiment of the present invention.

FIG. 3 is a diagram illustrating an example of a relationship between a motor temperature and a protection start motor temperature in the first embodiment of the present invention.

FIG. 4 is a diagram illustrating an example of a relationship between a motor temperature and a lock detection-time torque limitation value in the first embodiment of the present invention.

FIG. 9 is a diagram illustrating an example of a relationship between a cooling water temperature and inverter continuous energizable torque in the second embodiment of the present invention.

FIG. 10 is a diagram illustrating an example of a relationship between an inverter temperature and a protection start inverter temperature in the second embodiment of the present invention.

FIG. 11 is a diagram illustrating an example of a relationship between an inverter temperature and a lock detection-time torque limitation value in the second embodiment of the present invention.

DESCRIPTION OF EMBODIMENTS

Hereinafter, embodiments of the present invention will be described in detail with reference to the drawings.

First Embodiment

Figure 1:
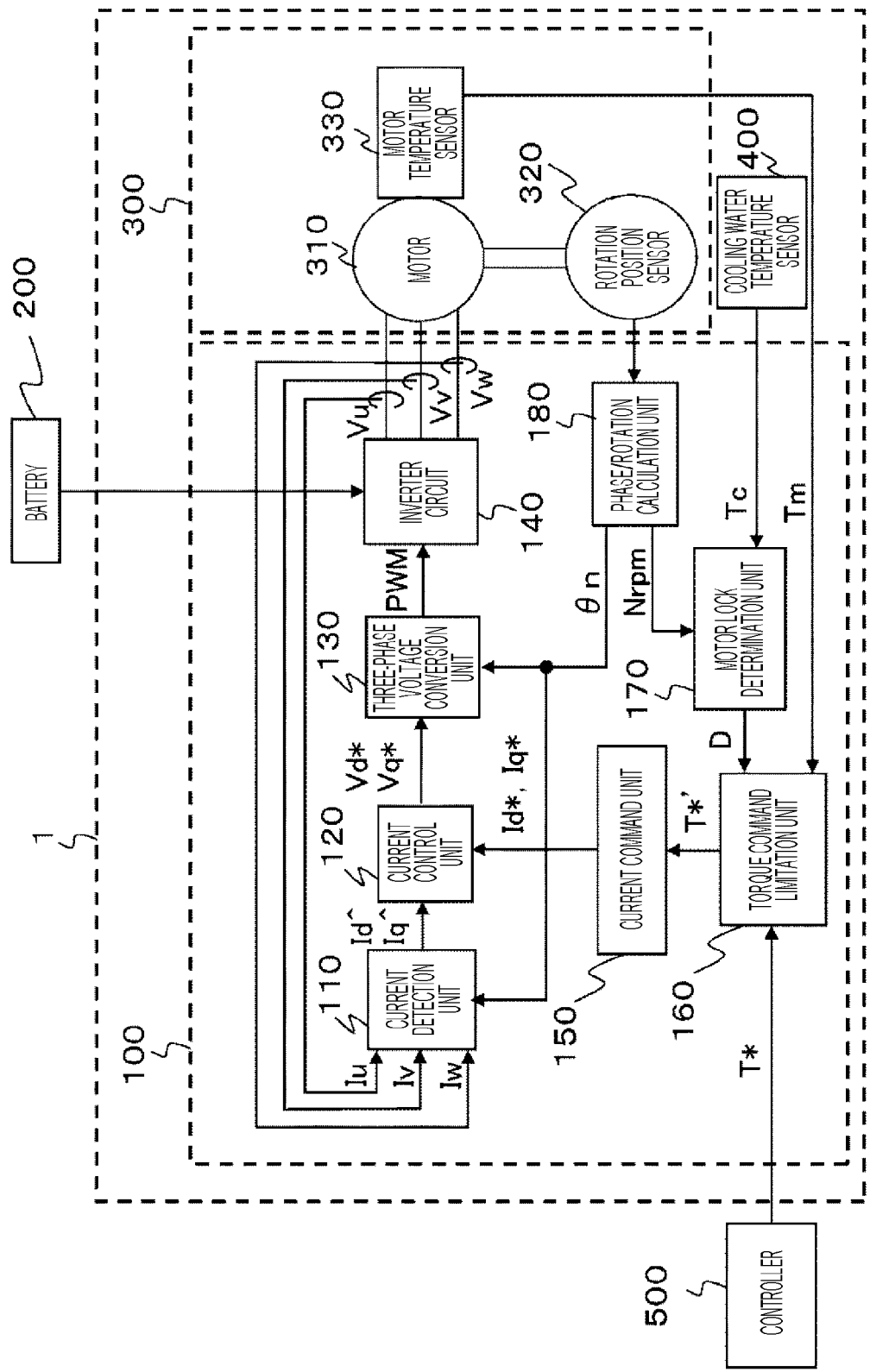
FIG. 1 is a block diagram illustrating an overall configuration of a motor device according to a first embodiment of the present invention.

FIG. 1 is a block diagram illustrating an overall configuration of a motor device 1 according to a first embodiment of the present invention. The motor device 1 includes a motor unit 300 including a motor 310, a motor control unit 100 that drives and controls the motor 310, and a cooling water temperature sensor 400. The motor 310 is cooled by a cooling mechanism (not illustrated) using cooling water so as not to be in an overheated state due to energization. The cooling water temperature sensor 400 detects a temperature of the cooling water as information indicating a state of the cooling mechanism and outputs a cooling water temperature Tc to the motor control unit 100. In a case where the motor 310 is in a locked state, the motor control unit 100 performs torque limitation using a predetermined torque limitation value so that a current flowing through the motor 310 does not become excessive. At this time, the motor control unit 100 changes the torque limitation value according to the cooling water temperature Tc from the cooling water temperature sensor 400, thereby limiting the current flowing through the motor 310 on the basis of the state of the cooling mechanism.

The motor control unit 100 includes a current detection unit 110, a current control unit 120, a three-phase voltage conversion unit 130, an inverter circuit 140, a current command unit 150, a torque command limitation unit 160, a motor lock determination unit 170, and a phase rotation calculation unit 180. A battery 200 and a controller 500 are connected to the motor control unit 100. The battery 200, which is a direct-current voltage source, supplies a predetermined direct-current voltage Edc to the motor control unit 100. The direct-current voltage Edc supplied from the battery 200 is converted into three-phase alternating-current voltages having a variable voltage and a variable frequency by the inverter circuit 140 of the motor control unit 100 and is applied to the motor 310.

The motor unit 300 includes the motor 310, a rotation position sensor 320, and a motor temperature sensor 330. The motor 310 is a synchronous motor that is driven to rotate by application of the three-phase alternating-current voltages (Vu, Vv, Vw) from the motor control unit 100. The rotation position sensor 320 is attached to the motor 310 so that the motor control unit 100 controls phases of the three-phase alternating-current voltages (Vu, Vv, Vw) in accordance with a phase of an induced voltage of the motor 310. The rotation position sensor 320 outputs a detection signal according to a rotation position, that is, an electrical angle of the motor 310, to the motor control unit 100. Here, a resolver configured by an iron core and winding is favorable for the rotation position sensor 320 but another type of sensor, for example, a giant magneto resistive (GMR) sensor using GMR effect, a sensor using a Hall element, or the like may be used. The motor temperature sensor 330 detects, for example, a temperature of a stator coil through which the current flows in the motor 310, as the temperature of the motor 310, and outputs a motor temperature Tm to the motor control unit 100.

The detection signal output from the rotation position sensor 320 is input to the phase rotation calculation unit 180 in the motor control unit 100. The phase rotation calculation unit 180 calculates a motor rotation position θn indicating a rotation position of the motor 310 and a motor rotation speed Nrpm indicating a rotation speed of the motor 310 on the basis of the detection signal of the rotation position sensor 320. Then, the phase rotation calculation unit 180 outputs the motor rotation position θn to the current detection unit 110 and the three-phase voltage conversion unit 130 and outputs the motor rotation speed Nrpm to the motor lock determination unit 170.

The motor control unit 100 has a current control function to control an output of the motor 310 according to a torque command from the controller 500. In the motor control unit 100, the motor lock determination unit 170 performs motor lock determination processing for determining whether the motor 310 is in the locked state on the basis of the motor rotation speed Nrpm from the phase rotation calculation unit 180 and the cooling water temperature Tc from the cooling water temperature sensor 400. Then, the motor lock determination unit 170 outputs a lock determination result D to the torque command limitation unit 160. Details of the motor lock determination processing by the motor lock determination unit 170 will be described below with reference to flowcharts.

The torque command limitation unit 160 performs torque limitation processing for limiting the torque command from the controller 500 on the basis of the lock determination result D from the motor lock determination unit 170 and the motor temperature Tm from the motor temperature sensor 330. Specifically, the torque command limitation unit 160 determines whether the motor 310 is in the locked state on the basis of the lock determination result D, and sets a torque limitation value according to the motor temperature Tm and the cooling water temperature Tc in the case where the motor 310 is in the locked state. Then, the torque command limitation unit 160 compares a torque demand value T* indicated by the torque command with the torque limitation value that is set, and in a case where the torque demand value T* exceeds the torque command, outputs, instead of the torque demand value T*, a post-limitation torque demand value T*', which is suppressed to the torque limitation value or less, to the current command unit 150 to limit the torque command. Note that, in the case where the torque demand value T* is the torque limitation value or less, the torque demand value T* may be output as is as the post-limitation torque demand value T*'. Details of the torque limitation processing by the torque command limitation unit 160 will be described below with reference to flowcharts.

The current command unit 150 calculates current command values (Id*, Iq*) according to the torque command on the basis of the post-limitation torque demand value T*' from the torque command limitation unit 160. Then, the current command unit 150 outputs the calculated current command values (Id*, Iq*) to the current control unit 120.

The current detection unit 110 obtains three-phase motor current values (Iu, Iv, Iw) on the basis of a sensor signal from a current sensor provided between the inverter circuit 140 and the motor 310. Then, the current detection unit 110 calculates current detection values (Id^, Iq^), which are dq-converted from the motor current values, on the basis of the motor rotation position θn from the phase rotation calculation unit 180, and outputs the current detection values (Id^, Iq^) to the current control unit 120.

The current control unit 120 compares the current detection values (Id^, Iq^) from the current detection unit 110 with the current command values (Id*, Iq*) from the current command unit 150, and calculates voltage commands (Vd*, Vq*) such that the compared values are respectively coincide with each other. Then, the current control unit 120 outputs the calculated voltage commands (Vd*, Vq*) to the three-phase voltage conversion unit 130.

The three-phase voltage conversion unit 130 converts the voltage commands (Vd*, Vq*) from the current control unit 120 into three-phase voltage commands on the basis of the motor rotation position θn from the phase rotation calculation unit 180. Then, the three-phase voltage conversion unit 130 performs pulse width modulation (PWM) on the basis of the voltage commands to generate drive signals and outputs the drive signals to the inverter circuit 140, thereby controlling ON/OFF of three-phase semiconductor switching elements included in the inverter circuit 140. With the ON/OFF control, the three-phase alternating-current voltages (Vu, Vv, Vw) output from the inverter circuit 140 to the motor 310 are adjusted, and the current flowing through the motor 310 is controlled to control the driving of the motor 310. Note that the inverter circuit 140 may be cooled using the above-described cooling mechanism.

Next, motor continuous energizable torque used in the torque limitation processing in the first embodiment of the present invention will be described. The motor continuous energizable torque is a torque value corresponding to the magnitude of a current that can continue to flow through the motor 310 when the motor 310 is in the locked state. Generally, temperature rise in the motor 310 can be further suppressed as the cooling water temperature in the cooling mechanism for cooling the motor 310 is lower. Therefore, the motor continuous energizable torque is inversely proportional to the cooling water temperature.

FIG. 2 is a diagram illustrating an example of a relationship between the cooling water temperature and the motor continuous energizable torque in the first embodiment of the present invention. The motor continuous energizable torque is set in the motor control unit 100 on the basis of the cooling water temperature Tc from the cooling water temperature sensor 400 according to the relationship as illustrated in the table in FIG. 2, for example. Note that the motor continuous energizable torque corresponding to the cooling water temperature not illustrated in FIG. 2 is favorably set to continuously change with respect to change in the cooling water temperature by linear interpolation or the like.

Next, a protection start motor temperature used in the torque limitation processing in the first embodiment of the present invention will be described. The protection start motor temperature is a motor temperature for further performing torque limitation by changing the torque limitation value in a case where the motor temperature continues to rise even after it is determined that the motor 310 is in the locked state and the torque limitation is started. For example, a motor temperature at which a stator coil of a phase, the temperature of which cannot be directly detected in the motor 310, does not reach a dangerous temperature even if a current flows through the stator coil in a concentrative manner, is set as the protection start motor temperature. Generally, the torque limitation should be strengthened at an earlier stage to avoid further rise in the motor temperature as the motor temperature at the start of the torque limitation of the motor 310 is higher. Therefore, deviation from the protection start motor temperature is made smaller as the motor temperature when the motor 310 transitions from the unlocked state to the locked state is higher.

FIG. 3 is a diagram illustrating an example of a relationship between the motor temperature and the protection start motor temperature in the first embodiment of the present invention. The protection start motor temperature is set in the motor control unit 100 on the basis of the motor temperature Tm from the motor temperature sensor 330 when the determination result for the state of the motor 310 changes from the unlocked state to the locked state according to the relationship as illustrated in the table in FIG. 3, for example. Note that the protection start motor temperature corresponding to the motor temperature not illustrated in FIG. 3 is favorably set to continuously change with respect to change in the motor temperature by linear interpolation or the like.

Next, a lock detection-time torque limitation value used in the torque limitation processing in the first embodiment of the present invention will be described. The lock detection-time torque limitation value in the present embodiment is a torque limitation value allowed from a time when it is determined that the motor 310 is in the locked state to a time when the motor temperature reaches the protection start motor temperature. Generally, the current flowing through the motor 310 should be suppressed to avoid an increase in the motor temperature as the motor temperature at the lock detection time is higher. Further, the torque limitation is not necessary until the motor temperature reaches the protection start motor temperature unless the motor temperature at the lock detection time is too high. Therefore, the lock detection-time torque limitation value is made smaller as the motor temperature is higher when the motor temperature when the motor 310 transitions from the unlocked state to the locked state is a predetermined value or more.

FIG. 4 is a diagram illustrating an example of a relationship between the motor temperature and the lock detection-time torque limitation value in the first embodiment of the present invention. The lock detection-time torque limitation value is set in the motor control unit 100 on the basis of the motor temperature Tm from the motor temperature sensor 330 when the determination result for the state of the motor 310 changes from the unlocked state to the locked state according to the relationship as illustrated in the table in FIG. 4, for example. Note that the lock detection-time torque limitation value corresponding to the motor temperature not illustrated in FIG. 4 is favorably set to continuously change with respect to change in the motor temperature by linear interpolation or the like.

Figure 5:
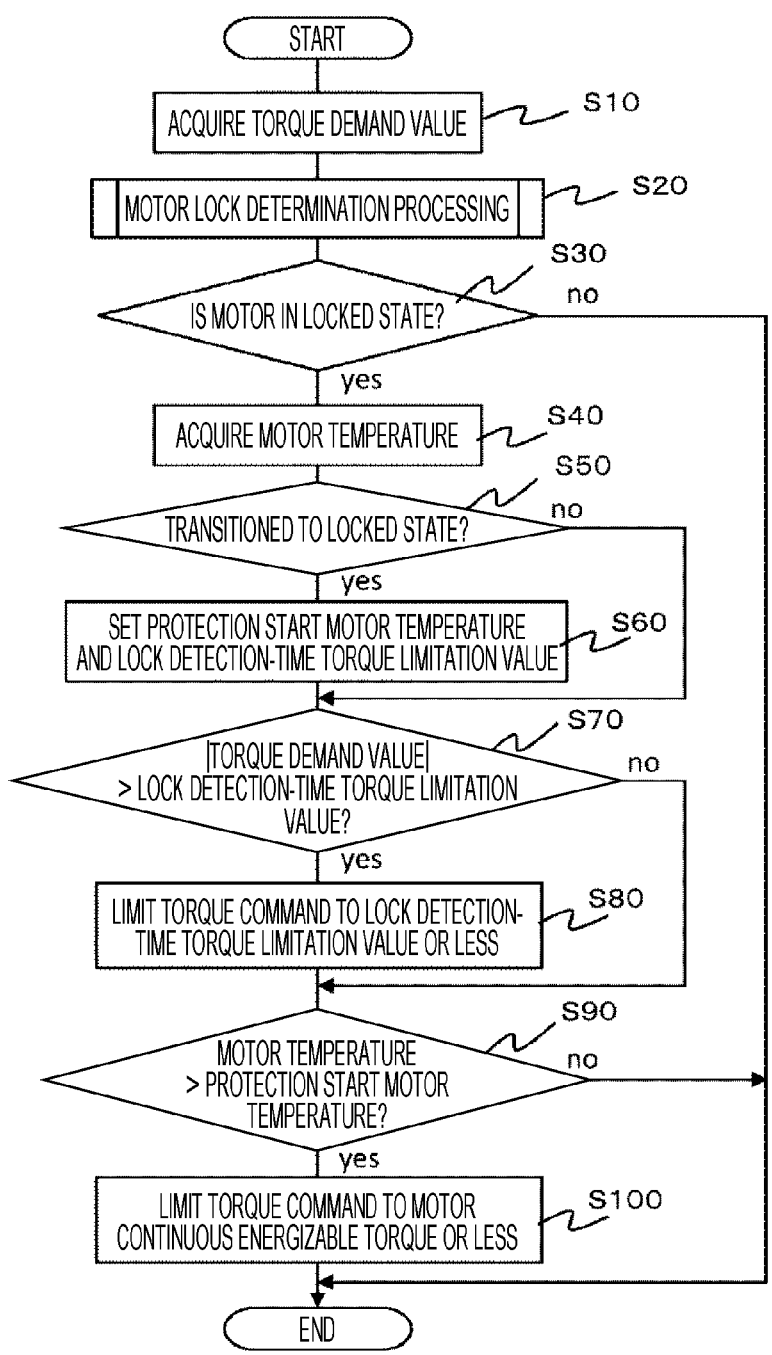
FIG. 5 is a flowchart illustrating a flow of torque limitation processing in the first embodiment of the present invention.
Figure 6:
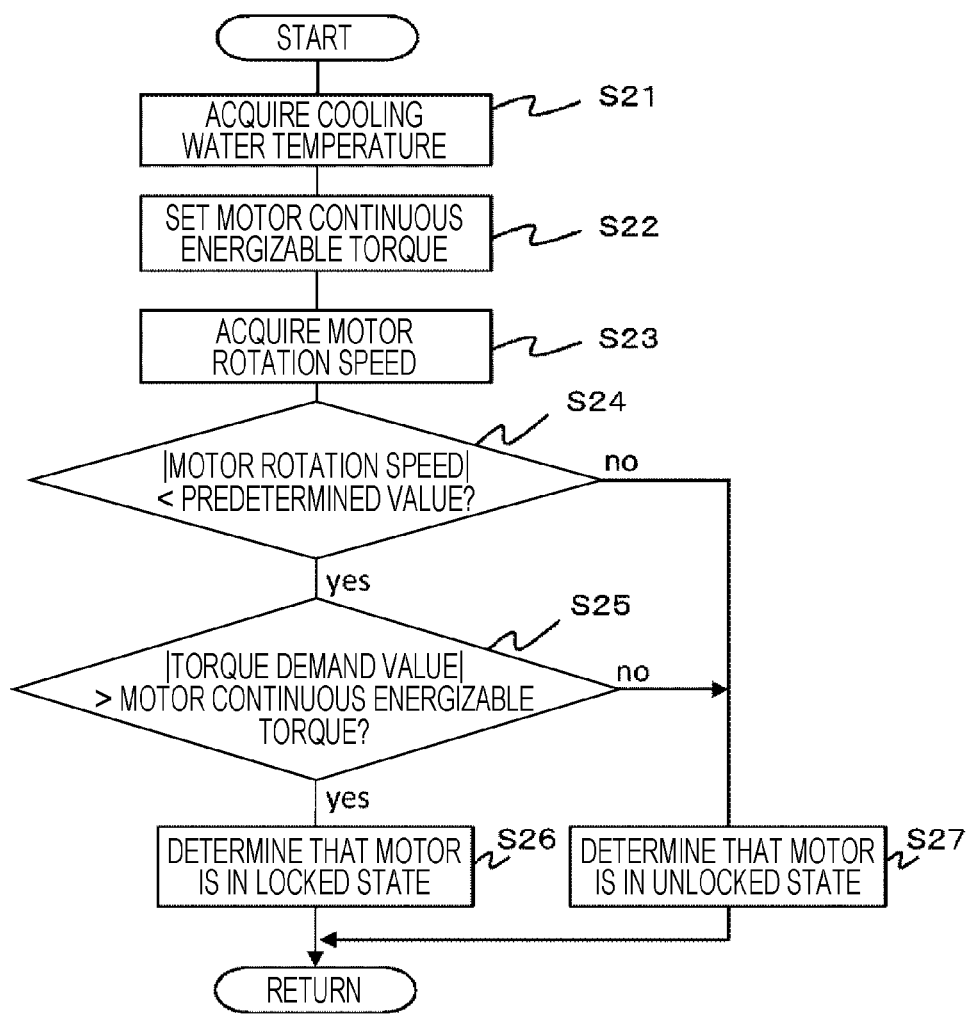
FIG. 6 is a flowchart illustrating a flow of motor lock determination processing in the first embodiment of the present invention.

Next, the torque limitation processing by the torque command limitation unit 160 and the motor lock determination processing by the motor lock determination unit 170 in the first embodiment of the present invention will be described with reference to the flowcharts in FIGS. 5 and 6. FIG. 5 is a flowchart illustrating a flow of the torque limitation processing in the first embodiment of the present invention. FIG. 6 is a flowchart illustrating a flow of the motor lock determination processing in the first embodiment of the present invention.

The torque command limitation unit 160 executes the torque limitation processing illustrated in FIG. 5 in every predetermined processing cycle, for example. In step S10 in FIG. 5, the torque command limitation unit 160 receives the torque command input from the controller 500 and acquires the torque demand value T*. Note that the torque demand value T* acquired in step S10 is used in step S70 to be described below and is output from the torque command limitation unit 160 to the motor lock determination unit 170.

In step S20, the motor lock determination unit 170 performs the motor lock determination processing for determining whether the motor 310 is in the locked state. Hereinafter, the motor lock determination processing in step S20 will be described according to the flowchart in FIG. 6.

In step S21 of FIG. 6, the motor lock determination unit 170 obtains the cooling water temperature Tc from the cooling water temperature sensor 400.

In step S22, the motor lock determination unit 170 sets the motor continuous energizable torque on the basis of the cooling water temperature Tc acquired in step S21. Here, the motor continuous energizable torque according to the cooling water temperature Tc is set using the relationship between the cooling water temperature and the motor continuous energizable torque illustrated in FIG. 2 stored in advance by the motor lock determination unit 170, for example. With the operation, the motor continuous energizable torque can be set as the torque limitation value according to the current energizable to the motor 310 based on the state of the cooling mechanism.

In step S23, the motor lock determination unit 170 obtains the motor rotation speed Nrpm according to the rotation state of the motor 310 from the phase rotation calculation unit 180.

In step S24, the motor lock determination unit 170 determines whether an absolute value of the motor rotation speed Nrpm acquired in step S23 is less than a predetermined threshold value. As a result, in the case where the absolute value of the motor rotation speed Nrpm is less than the threshold value, the processing proceeds to step S25. Otherwise, that is, in the case where the absolute value of the motor rotation speed Nrpm is the threshold value or more, the processing proceeds to step S27.

In step S25, the motor lock determination unit 170 determines whether an absolute value of the torque demand value T* acquired by the torque command limitation unit 160 in step S10 in FIG. 5 is larger than the motor continuous energizable torque determined in step S22. As a result, in the case where the absolute value of the torque demand value T* exceeds the motor continuous energizable torque, the processing proceeds to step S26. Otherwise, that is, in the case where the absolute value of the torque demand value T* is the motor continuous energizable torque or less, the processing proceeds to step S27.

In step S26, the motor lock determination unit 170 determines that the motor 310 is in the locked state.

In step S27, the motor lock determination unit 170 determines that the motor 310 is in the unlocked state. That is, the motor lock determination unit 170 determines that the motor 310 is not the locked state.

After executing step S26 or S27, the motor lock determination unit 170 outputs a determination result to the torque command limitation unit 160 as the lock determination result D and terminates the motor lock determination processing in FIG. 6. According to the processing described above, the motor lock determination unit 170 can determine whether the motor 310 is in the locked state on the basis of the rotation state of the motor 310.

Returning to the description of FIG. 5, in step S30, the torque command limitation unit 160 determines whether it has been determined that the motor 310 has been in the locked state in the motor lock determination processing executed in step S20. As a result, in the case where it has been determined that the motor 310 has been in the locked state, that is, the lock determination result D indicating the locked state is obtained by the motor lock determination processing, the processing proceeds to step S40. Meanwhile, in the case where the motor 310 has been determined not to be in the locked state, that is, the lock determination result D indicating the unlocked state is obtained by the motor lock determination processing, the torque limitation processing in FIG. 5 is terminated. In this case, no torque limitation is performed in the motor control unit 100, and a voltage according to the torque demand value T* is applied from the motor control unit 100 to the motor 310.

In step S40, the torque command limitation unit 160 acquires the motor temperature Tm from the motor temperature sensor 330.

In step S50, the torque command limitation unit 160 determines whether the motor 310 has transitioned from the unlocked state to the locked state. In the case where the motor 310 has transitioned from the unlocked state to the locked state, that is, the lock determination result D obtained in the motor lock determination processing in step S20 has been the unlocked state in the previous processing and changes to the locked state in this processing, the processing proceeds to step S60. Meanwhile, in the case where the motor 310 has not transitioned from the unlocked state to the locked state, that is, the lock determination result D indicating the locked state has already been obtained in the previous processing, the processing proceeds to step S70. In this case, since the protection start motor temperature and the lock detection-time torque limitation value have already set in the previous processing, execution of the processing in step S60 described below is not necessary.

In step S60, the torque command limitation unit 160 sets the protection start motor temperature and the lock detection-time torque limitation value on the basis of the motor temperature Tm acquired in step S40. Here, the protection start motor temperature according to the motor temperature Tm is set using the relationship between the motor temperature and the protection start motor temperature illustrated in FIG. 3 stored in advance by the torque command limitation unit 160, for example. Further, the lock detection-time torque limitation value according to the motor temperature Tm is set using the relationship between the motor temperature and the lock detection-time torque limitation value illustrated in FIG. 4 stored in advance by the torque command limitation unit 160, for example. With the operation, the protection start motor temperature and the lock detection-time torque limitation value can be set on the basis of the temperature of the motor 310 when the lock determination result D by the motor lock determination unit 170 changes from the unlocked state to the locked state.

In step S70, the torque command limitation unit 160 determines whether an absolute value of the torque demand value T* acquired in step S10 is larger than the lock detection-time torque limitation value set in step S60. As a result, in the case where the absolute value of the torque demand value T* exceeds the lock detection-time torque limitation value, the torque command limitation unit 160 determines that the torque limitation is necessary to protect the motor 310, and the processing proceeds to step S80. Otherwise, that is, in the case where the absolute value of the torque demand value T* is the lock detection-time torque limitation value or less, the processing proceeds to step S90.

In step S80, the torque command limitation unit 160 limits the torque command from the controller 500 to the lock detection-time torque limitation value or less. Specifically, the torque command limitation unit 160 outputs the lock detection-time torque limitation value to the current command unit 150 as the post-limitation torque demand value T*', instead of the torque demand value T* in the torque command input from the controller 500.

In step S90, the torque command limitation unit 160 determines whether the motor temperature Tm acquired in step S40 is larger than the protection start motor temperature set in step S60. As a result, in the case where the motor temperature Tm exceeds the protection start motor temperature, the torque command limitation unit 160 determines that further torque limitation is necessary to suppress heat generation in the motor 310, and the processing proceeds to step S100. Otherwise, that is, in the case where the motor temperature Tm is the protection start motor temperature or less, the torque limitation processing in FIG. 5 is terminated.

In step S100, the torque command limitation unit 160 limits the torque command from the controller 500 to the motor continuous energizable torque or less, which has been set by the motor lock determination unit 170 in step S22 in FIG. 6. Specifically, the torque command limitation unit 160 outputs the motor continuous energizable torque to the current command unit 150 as the post-limitation torque demand value T*', instead of the torque demand value T* in the torque command input from the controller 500. With the operation, the torque command is limited to the motor continuous energizable torque or less, the motor continuous energizable torque being the torque limitation value according to the current energizable to the motor 310 based on the state of the cooling mechanism. As a result, the current output from the inverter circuit 140 to the motor 310 can be limited on the basis of the state of the cooling mechanism that cools the motor 310. After executing the processing in step S100, the torque command limitation unit 160 terminates the torque limitation processing in FIG. 5.

Figure 7:
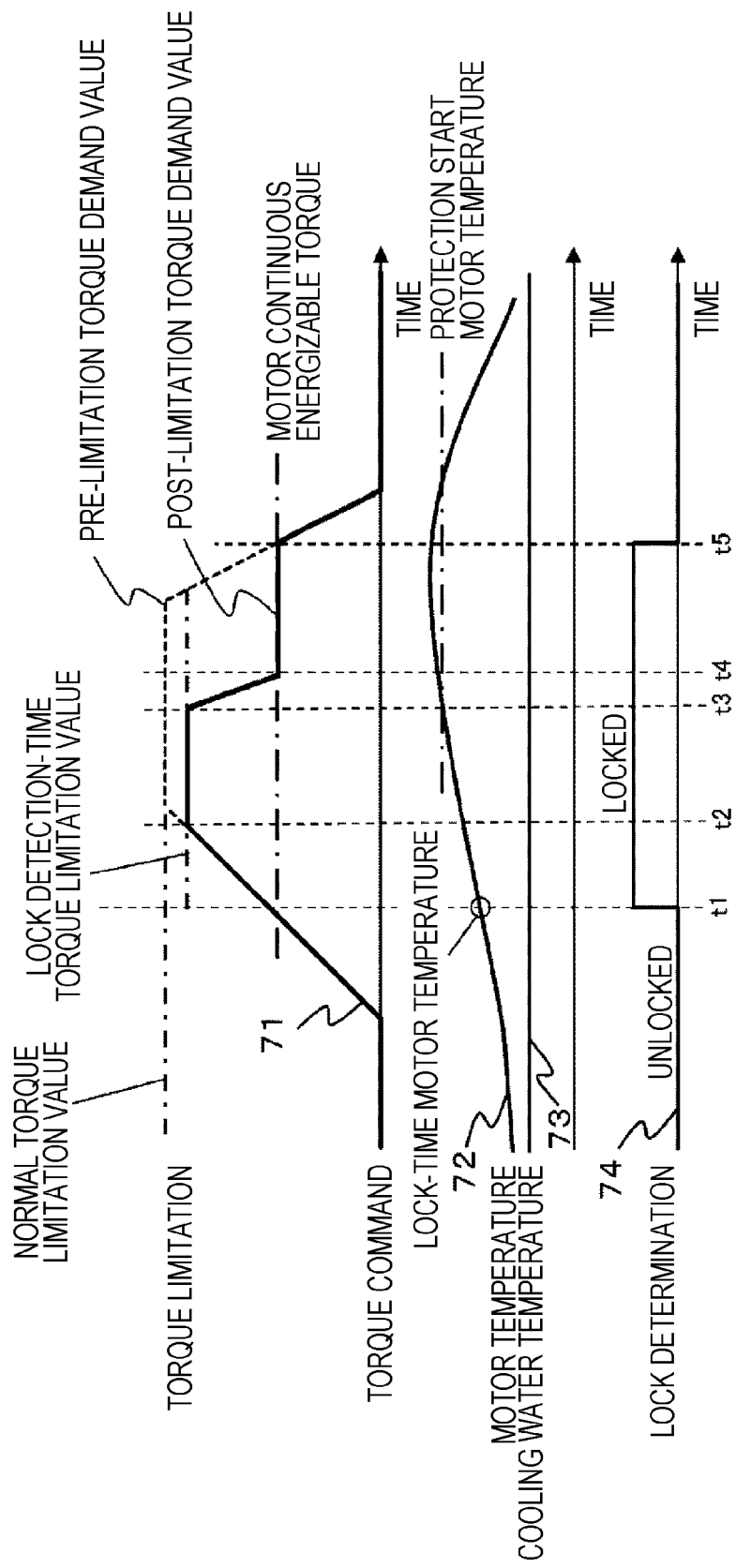
FIG. 7 is a diagram illustrating an operation example of the motor device in the torque limitation processing according to the first embodiment of the present invention.

FIG. 7 is a diagram illustrating an operation example of the motor device 1 in the torque limitation processing according to the above-described first embodiment of the present invention. In FIG. 7, the graph 71 illustrates time change in the torque demand value T* and the post-limitation torque demand value T*' in the torque command, the graph 72 illustrates time change in the motor temperature Tm, the graph 73 illustrates time change in the cooling water temperature Tc, and the graph 74 illustrates time change in the lock determination result D by the motor lock determination unit 170, respectively.

When the torque demand value T* exceeds the motor continuous energizable torque at time t1, the lock determination result D changes from the unlocked state to the locked state by the motor lock determination processing described in FIG. 6. Then, the motor temperature Tm at this time is detected as a lock-time motor temperature, and the protection start motor temperature and the lock detection-time torque limitation value are set.

When the torque demand value T* reaches the lock detection-time torque limitation value at time t2, the torque limitation is performed in the torque command limitation unit 160 at and after time t2, and the set lock detection-time torque limitation value is output as the post-limitation torque demand value T*'. Note that the broken line in the graph 71 represents the pre-limitation torque demand value T* before being input to the torque command limitation unit 160. The torque demand value T* is limited in the controller 500 to be the torque limitation value or less. Note that the controller 500 may not limit the torque demand value T*. In this case, if the torque demand value T* exceeds the normal torque limitation value when the lock determination result D is the unlocked state, the torque command limitation unit 160 may simply output the normal torque limitation value as the post-limitation torque demand value T*'.

When the motor temperature Tm continues to rise by continuing energization from the inverter circuit 140 to the motor 310 at and after the time t2 and the motor temperature Tm reaches the set protection start motor temperature at time t3, the torque command limitation unit 160 further performs the torque limitation at and after the time t3. Here, the post-limitation torque demand value T*' is decreased from the lock detection-time torque limitation value to the motor continuous energizable torque at a predetermined change rate. When the post-limitation torque demand value T*' is decreased to the motor continuous energizable torque at time t4, the motor continuous energizable torque is output as the post-limitation torque demand value T*' at and after the time 4. With the operation, the motor continuous energizable torque is set according to the cooling water temperature Tc. Therefore, the post-limitation torque demand value T*' can be made variable according to the cooling water temperature Tc. As a result, the temperature rise in the coil and the like through which the current flows in the motor 310 is suppressed while the post-limitation torque demand value T*' is reduced as much as possible on the basis of the state of the cooling mechanism, whereby the motor 310 can be prevented from being in the overheated state When the torque demand value T* falls below the motor continuous energizable torque at time t5, the torque demand value T* is output without being limited. Further, in this case, since determination condition of the locked state in the motor lock determination processing is not satisfied, the lock determination result D changes from the locked state to the unlocked state, and the torque limitation is canceled.

According to the first embodiment of the present invention described above, the following functions and effects are exhibited.

(1) The motor control unit 100 limits the current to be output from the inverter circuit 140 to the motor 310 on the basis of the state of the cooling mechanism that cools at least the motor 310 in the case where the motor 310 driven by the inverter circuit 140 is in the locked state. Specifically, the motor control unit 100 includes the current command unit 150 configured to calculate the current command values (Id*, Iq*) for determining the current to be output to the motor 310 on the basis of the input torque command, the motor lock determination unit 170 configured to determine whether the motor 310 is in the locked state on the basis of the motor rotation speed Nrpm indicating the rotation state of the motor 310, and the torque command limitation unit 160 configured to limit the current to be output to the motor 310 by limiting the torque command on the basis of the cooling water temperature Tc indicating a state of the cooling mechanism in a case where the motor lock determination unit 170 determines that the motor 310 is in the locked state. With the configuration, the current output from the inverter circuit 140 to the motor 310 can be appropriately limited according to the state of the cooling mechanism that cools the motor 310.

(2) The torque command limitation unit 160 sets the torque limitation value according to the current based on the state of the cooling mechanism and energizable to the motor 310, that is, the motor continuous energizable torque, and limits the torque command to the motor continuous energizable torque or less (step S100). With the configuration, when the motor 310 is in the locked state, an overheated state of the motor 310 can be prevented while the energization to the motor 310 is continued.

(3) The motor lock determination unit 170 determines that the motor 310 is in the locked state (step S26) when the motor rotation speed Nrpm is less than the predetermined value (step S24: Yes) and the torque demand value T* in the torque command exceeds the motor continuous energizable torque command (step S25: Yes). With the configuration, when the motor 310 is in the locked state, the locked state can be reliably determined.

(4) The torque command limitation unit 160 sets the protection start motor temperature on the basis of the motor temperature Tm when the determination result by the motor lock determination unit 170 changes from the unlocked state to the locked state (step S60), and limits the torque command to the motor continuous energizable torque or less (step S100) when the motor temperature Tm exceeds the protection start motor temperature (step S90: Yes). With the configuration, the torque limitation can be performed at appropriate timing according to the temperature of the motor 310 at the lock detection time.

Second Embodiment

Figure 8:
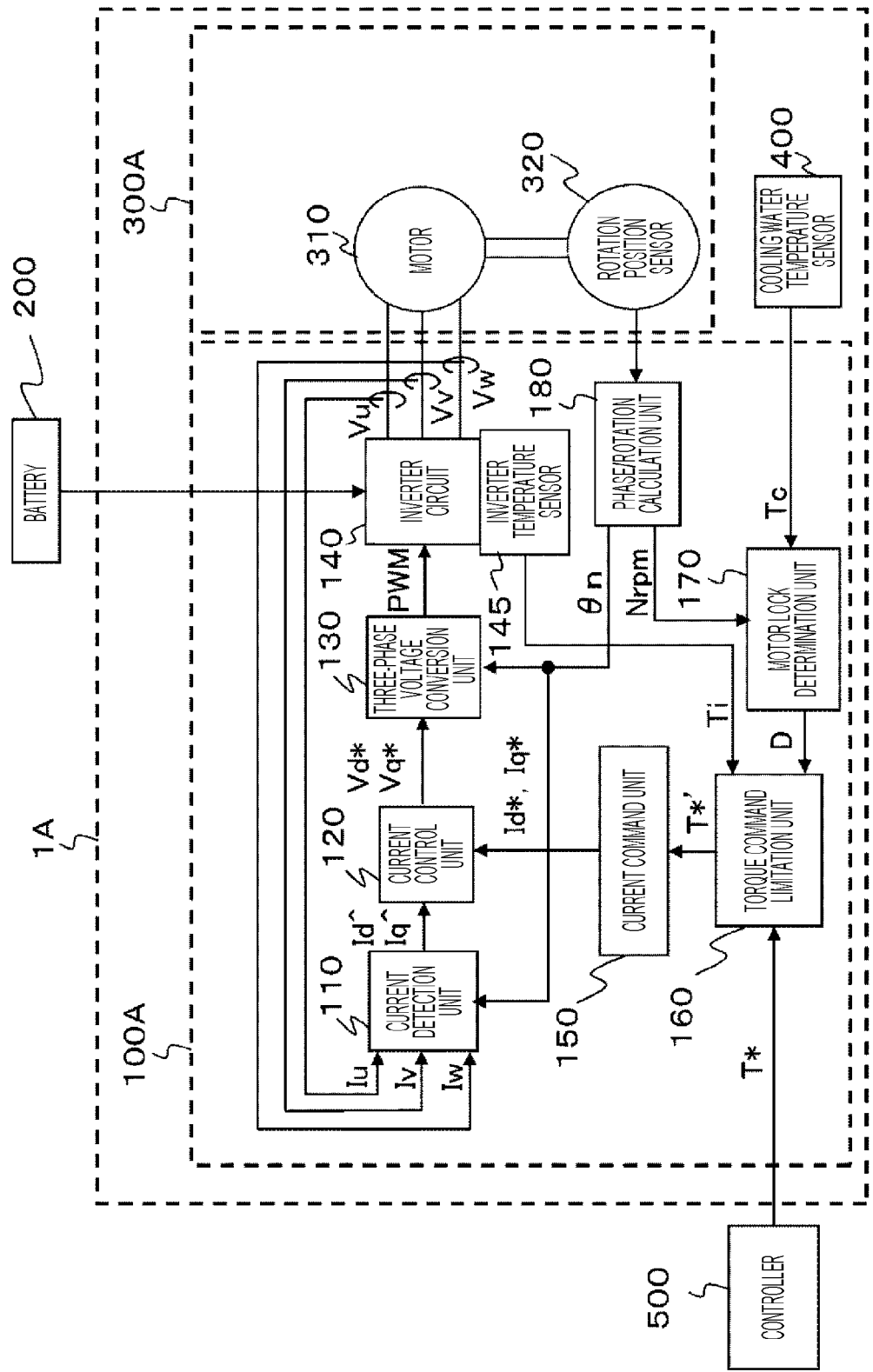
FIG. 8 is a block diagram illustrating an overall configuration of a motor device according to a second embodiment of the present invention.

FIG. 8 is a block diagram illustrating an overall configuration of a motor device 1A according to a second embodiment of the present invention. The motor device 1A includes a motor unit 300A including a motor 310, a motor control unit 100A that drives and controls the motor 310, and a cooling water temperature sensor 400.

The motor control unit 100A further includes an inverter temperature sensor 145 in addition to the constituent elements of the motor control unit 100 in FIG. 1 described in the first embodiment. Further, processing content of a torque command limitation unit 160 and a motor lock determination unit 170 is different from that of the motor control unit 100. Meanwhile, the motor unit 300A does not include the motor temperature sensor 330 of the constituent elements of the motor unit 300 in FIG. 1 described in the first embodiment. Apart from these points, similar configurations to those of the first embodiment are included. Hereinafter, the motor device 1A according to the present embodiment will be described focusing on the differences from the first embodiment.

In the present embodiment, an inverter circuit 140 of the motor control unit 100A is cooled by a cooling mechanism (not illustrated) using cooling water so as not to be in an overheated state due to energization. Note that the motor 310 may be cooled using the above-described cooling mechanism.

The inverter temperature sensor 145 detects a temperature of a semiconductor switching element through which a current flows in the inverter circuit 140, as a temperature of the inverter circuit 140, for example, and outputs an inverter temperature Ti to the torque command limitation unit 160. In the present embodiment, the torque command limitation unit 160 performs torque limitation processing for limiting a torque command from a controller 500, using the inverter temperature Ti from the inverter temperature sensor 145 in place of a motor temperature Tm.

Next, inverter continuous energizable torque used in the torque limitation processing in the second embodiment of the present invention will be described. The inverter continuous energizable torque is a torque value corresponding to the magnitude of a current that can continue to flow through the inverter circuit 140 when the motor 310 is in a locked state. Generally, temperature rise in the inverter circuit 140 can be further suppressed as the cooling water temperature in the cooling mechanism for cooling the inverter circuit 140 is lower. Therefore, the inverter continuous energizable torque is inversely proportional to a cooling water temperature, similarly to the motor continuous energizable torque described in the first embodiment.

FIG. 9 is a diagram illustrating an example of a relationship between the cooling water temperature and the inverter continuous energizable torque in the second embodiment of the present invention. The inverter continuous energizable torque is set in the motor control unit 100A on the basis of a cooling water temperature Tc from the cooling water temperature sensor 400 according to the relationship as illustrated in the table in FIG. 9, for example. Note that the inverter continuous energizable torque corresponding to the cooling water temperature not illustrated in FIG. 9 is favorably set to continuously change with respect to change in the cooling water temperature by linear interpolation or the like.

Next, a protection start inverter temperature used in the torque limitation processing in the second embodiment of the present invention will be described. The protection start inverter temperature is an inverter temperature for further performing torque limitation by changing the torque limitation value in a case where the inverter temperature continues to rise even after it is determined that the motor 310 is in the locked state and the torque limitation is started. For example, a temperature at which a switching element of a phase, temperature of which cannot be directly detected in the inverter circuit 140, does not reach a dangerous temperature even if a current flows through the semiconductor switching element in a concentrative manner, is set as the protection start inverter temperature. Generally, the torque limitation should be strengthened at an earlier stage to avoid further rise in the inverter temperature as the inverter temperature at the start of the torque limitation of the motor 310 is higher. Therefore, deviation from the protection start inverter temperature is made smaller as the inverter temperature when the motor 310 transitions from an unlocked state to the locked state is higher, similarly to the protection start motor temperature described in the first embodiment.

FIG. 10 is a diagram illustrating an example of a relationship between the inverter temperature and the protection start inverter temperature in the second embodiment of the present invention. The protection start inverter temperature is set in the motor control unit 100A on the basis of the inverter temperature Ti from the inverter temperature sensor 145 when the determination result for the state of the motor 310 changes from the unlocked state to the locked state according to the relationship as illustrated in the table in FIG. 10, for example. Note that the protection start inverter temperature corresponding to the inverter temperature not illustrated in FIG. 10 is favorably set to continuously change with respect to change in the inverter temperature by linear interpolation or the like.

Next, a lock detection-time torque limitation value used in the torque limitation processing in the second embodiment of the present invention will be described. The lock detection-time torque limitation value in the present embodiment is a torque limitation value allowed from a time when it is determined that the motor 310 is in the locked state to a time when the inverter temperature reaches the protection start inverter temperature. Generally, the current flowing through the inverter circuit 140 should be suppressed to avoid an increase in the inverter temperature as the inverter temperature at the lock detection time is higher. Further, the torque limitation is not necessary until the inverter temperature reaches the protection start inverter temperature unless the inverter temperature at the lock detection time is too high. Therefore, the lock detection-time torque limitation value is made smaller as the inverter temperature is higher when the inverter temperature when the motor 310 transitions from the unlocked state to the locked state is a predetermined value or more, similarly to the description in the first embodiment.

FIG. 11 is a diagram illustrating an example of a relationship between the inverter temperature and the lock detection-time torque limitation value in the second embodiment of the present invention. The lock detection-time torque limitation value is set in the motor control unit 100A on the basis of the inverter temperature Ti from the inverter temperature sensor 145 when the determination result for the state of the motor 310 changes from the unlocked state to the locked state according to the relationship as illustrated in the table in FIG. 11, for example. Note that the lock detection-time torque limitation value corresponding to the inverter temperature not illustrated in FIG. 11 is favorably set to continuously change with respect to change in the inverter temperature by linear interpolation or the like.

Figure 12:
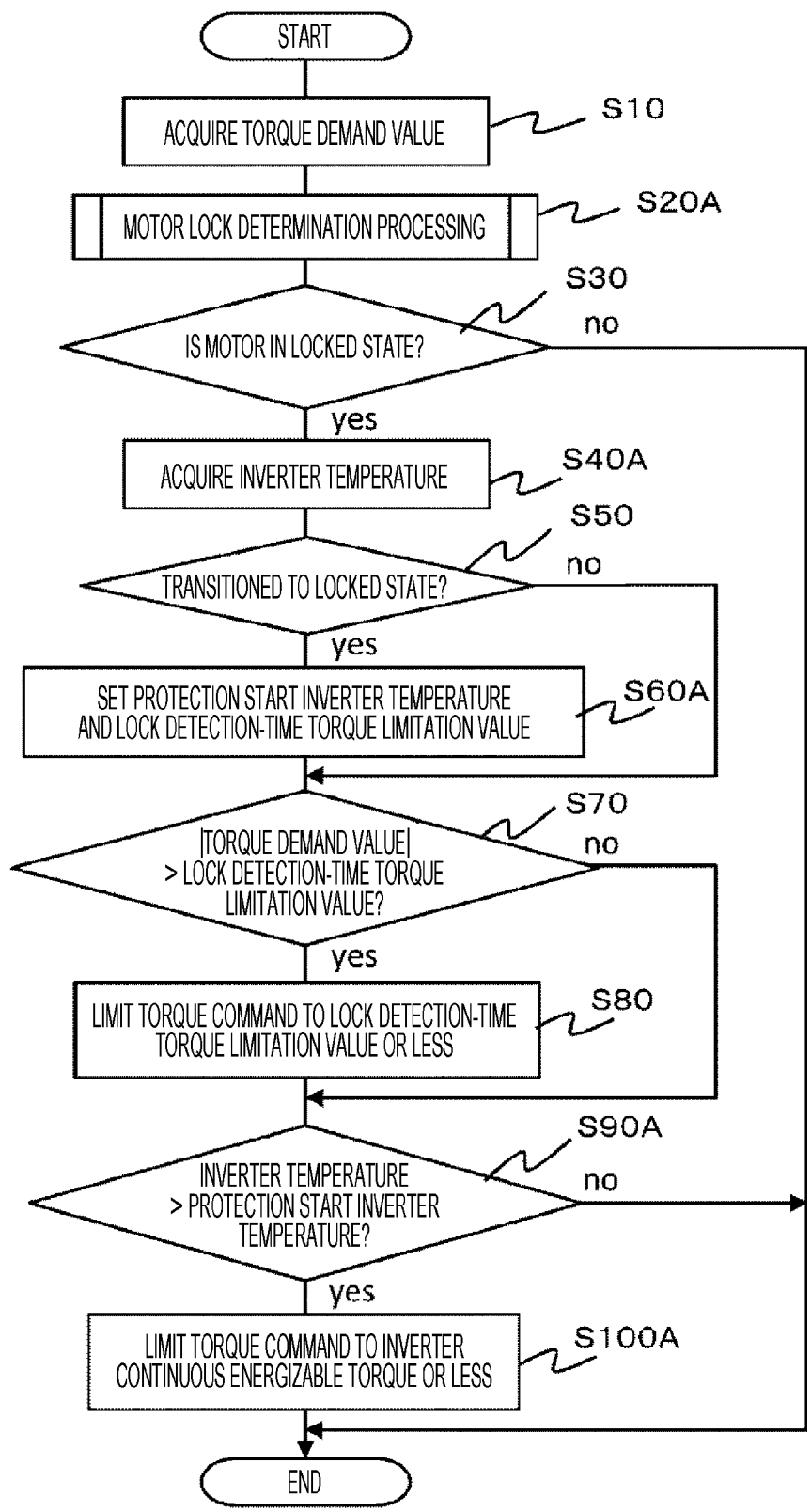
FIG. 12 is a flowchart illustrating a flow of torque limitation processing in the second embodiment of the present invention.
Figure 13:
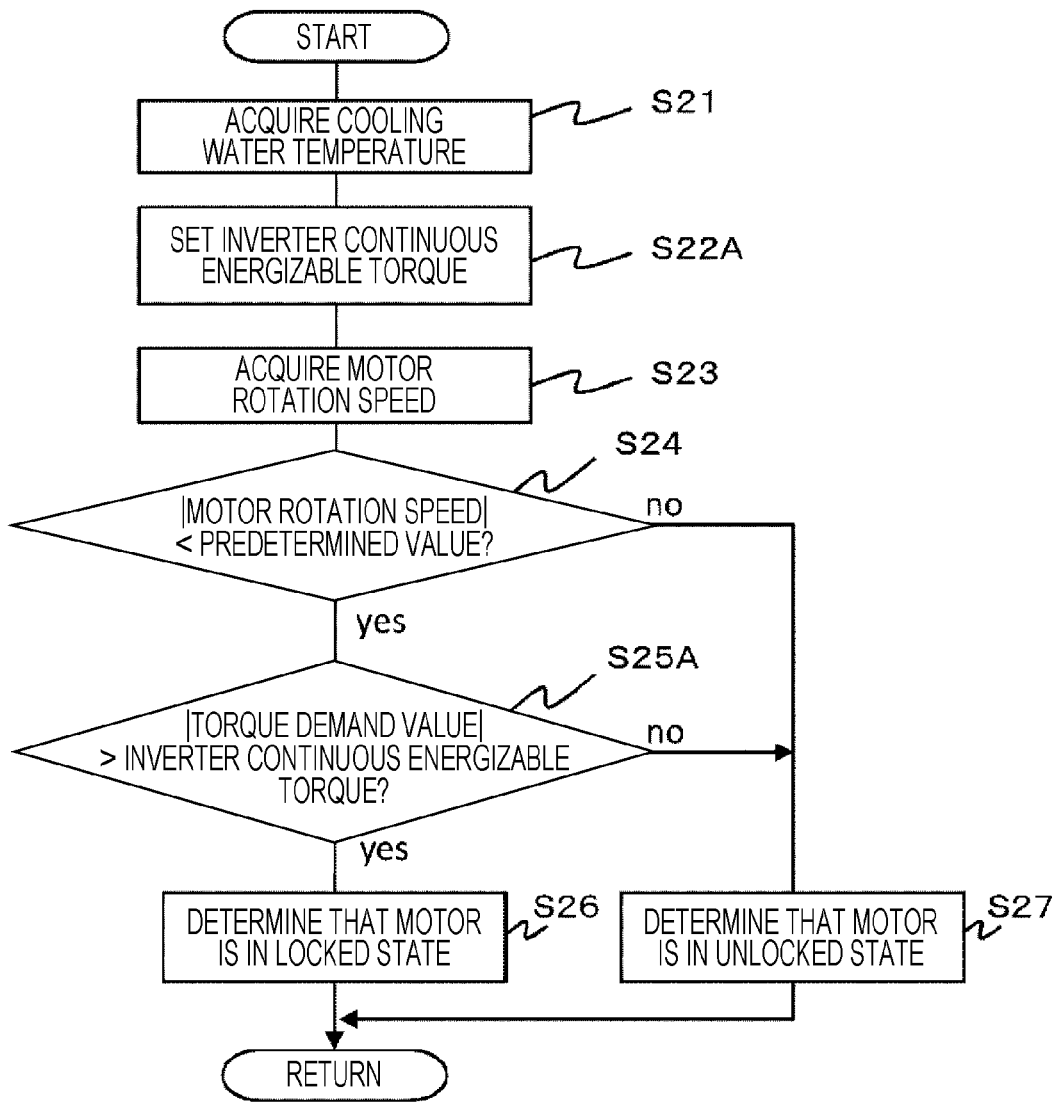
FIG. 13 is a flowchart illustrating a flow of motor lock determination processing in the second embodiment of the present invention.

Next, the torque limitation processing by the torque command limitation unit 160 and the motor lock determination processing by the motor lock determination unit 170 in the second embodiment of the present invention will be described with reference to the flowcharts in FIGS. 12 and 13. FIG. 12 is a flowchart illustrating a flow of the torque limitation processing in the second embodiment of the present invention. FIG. 13 is a flowchart illustrating a flow of the motor lock determination processing in the second embodiment of the present invention. Note that, in FIGS. 12 and 13, the same step numbers are assigned to portions that perform the same processing as in FIGS. 5 and 6 described in the first embodiment. Hereinafter, description of the processing in the same step numbers as in FIGS. 5 and 6 are omitted unless particularly necessary.

In step S20A in FIG. 12, the motor lock determination unit 170 performs the motor lock determination processing for determining whether the motor 310 is in the locked state. Hereinafter, the motor lock determination processing in step S20A will be described according to the flowchart in FIG. 13.

In step S22A in FIG. 13, the motor lock determination unit 170 sets inverter continuous energizable torque on the basis of the cooling water temperature Tc acquired in step S21. Here, the inverter continuous energizable torque according to the cooling water temperature Tc is set using the relationship between the cooling water temperature and the inverter continuous energizable torque illustrated in FIG. 9 stored in advance by the motor lock determination unit 170, for example. With the operation, the inverter continuous energizable torque can be set as the torque limitation value according to the current energizable to the inverter circuit 140 based on the state of the cooling mechanism.

In step S25A, the motor lock determination unit 170 determines whether an absolute value of a torque demand value T* acquired by the torque command limitation unit 160 in step S10 in FIG. 12 is larger than the inverter continuous energizable torque determined in step S22A. As a result, in a case where the absolute value of the torque demand value T* exceeds the inverter continuous energizable torque, the processing proceeds to step S26, and it is determined that the motor 310 is in the locked state. Otherwise, that is, in a case where the absolute value of the torque demand value T* is the inverter continuous energizable torque or less, the processing proceeds to step S27, and it is determined that the motor 310 is in the unlocked state. After executing step S26 or S27, the motor lock determination unit 170 outputs a determination result to the torque command limitation unit 160 as a lock determination result D and terminates the motor lock determination processing in FIG. 13.

Returning to the description of FIG. 5, in step S40A, the torque command limitation unit 160 acquires the inverter temperature Ti from the inverter temperature sensor 145.

In step S60A, the torque command limitation unit 160 sets the protection start inverter temperature and the lock detection-time torque limitation value on the basis of the inverter temperature Ti acquired in step S40A. Here, the protection start inverter temperature according to the inverter temperature Ti is set using the relationship between the inverter temperature and the protection start inverter temperature illustrated in FIG. 10 stored in advance by the torque command limitation unit 160, for example. Further, the lock detection-time torque limitation value according to the inverter temperature Ti is set using the relationship between the inverter temperature and the lock detection-time torque limitation value illustrated in FIG. 11 stored in advance by the torque command limitation unit 160, for example. With the operation, the protection start inverter temperature and the lock detection-time torque limitation value can be set on the basis of the temperature of the inverter circuit 140 when the lock determination result D by the motor lock determination unit 170 changes from the unlocked state to the locked state.

In step S90A, the torque command limitation unit 160 determines whether the inverter temperature Ti acquired in step S40A is larger than the protection start inverter temperature set in step S60A. As a result, in the case where the inverter temperature Ti exceeds the protection start inverter temperature, the torque command limitation unit 160 determines that further torque limitation is necessary to suppress heat generation in the inverter circuit 140, and the processing proceeds to step S100A. Otherwise, that is, in a case where the inverter temperature Ti is the protection start inverter temperature or less, the torque limitation processing in FIG. 12 is terminated.

In step S100A, the torque command limitation unit 160 limits the torque command from the controller 500 to the inverter continuous energizable torque or less, which has been set by the motor lock determination unit 170 in step S22A in FIG. 13. Specifically, the torque command limitation unit 160 outputs the inverter continuous energizable torque to the current command unit 150 as a post-limitation torque demand value T*', instead of the torque demand value T* in the torque command input from the controller 500. With the operation, the torque command is limited to the inverter continuous energizable torque or less, the inverter continuous energizable torque being the torque limitation value according to the current energizable to the inverter circuit 140 based on the state of the cooling mechanism. As a result, the current output from the inverter circuit 140 to the motor 310 can be limited on the basis of the state of the cooling mechanism that cools the inverter circuit 140. After executing the processing in step S100A, the torque command limitation unit 160 terminates the torque limitation processing in FIG. 12.

Figure 14:
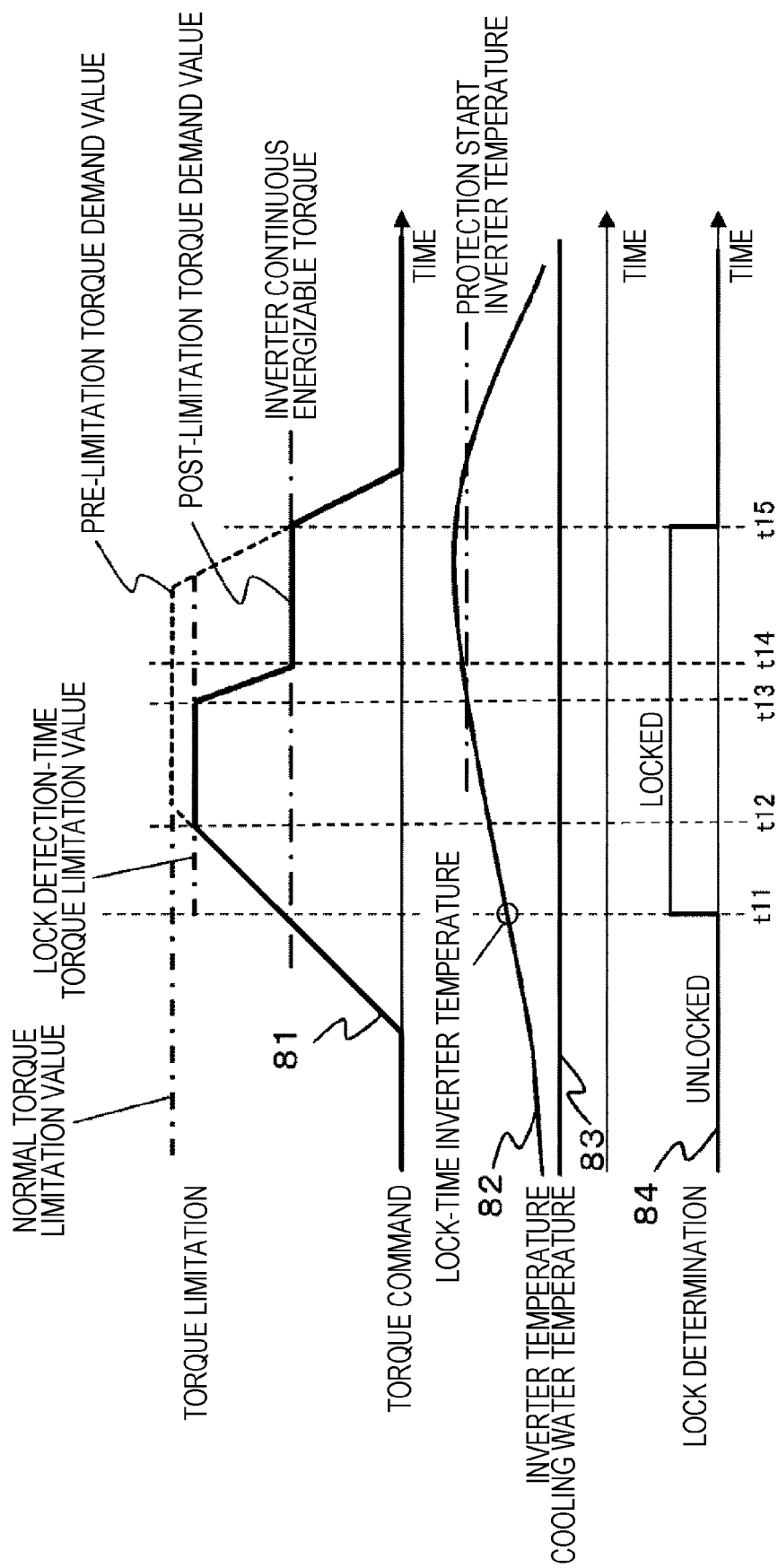
FIG. 14 is a diagram illustrating an operation example of the motor device in the torque limitation processing according to the second embodiment of the present invention.

FIG. 14 is a diagram illustrating an operation example of the motor device 1A in the torque limitation processing according to the above-described second embodiment of the present invention. In FIG. 14, the graph illustrates time change in the torque demand value T* and the post-limitation torque demand value T*' in the torque command, the graph 82 illustrates time change in the inverter temperature Ti, the graph 83 illustrates time change in the cooling water temperature Tc, and the graph 84 illustrates time change in the lock determination result D by the motor lock determination unit 170, respectively.

When the torque demand value T* exceeds the inverter continuous energizable torque at time t11, the lock determination result D changes from the unlocked state to the locked state by the motor lock determination processing described in FIG. 13. Then, the inverter temperature Ti at this time is detected as a lock-time inverter temperature, and the protection start inverter temperature and the lock detection-time torque limitation value are set.

When the torque demand value T* reaches the lock detection-time torque limitation value at time t12, the torque limitation is performed in the torque command limitation unit 160 at and after time t12, and the set lock detection-time torque limitation value is output as the post-limitation torque demand value T*'. Note that the broken line in the graph 81 represents the pre-limitation torque demand value T* before being input to the torque command limitation unit 160. This torque demand value T* may be limited to the normal torque limitation value or less in the controller 500, or the normal torque limitation value may be output as the post-limitation torque demand value T*' in the torque command limitation unit 160 when the torque demand value T* when the lock determination result D is in the unlocked state exceeds the normal torque limitation value, similarly to the first embodiment.

When the inverter temperature Ti continues to rise by continuing energization from the inverter circuit 140 to the motor 310 at and after the time t12 and the inverter temperature Ti reaches the set protection start inverter temperature at time t13, the torque command limitation unit 160 further performs the torque limitation at and after the time t13. Here, the post-limitation torque demand value T*' is decreased from the lock detection-time torque limitation value to the inverter continuous energizable torque at a predetermined change rate. When the post-limitation torque demand value T*' is decreased to the inverter continuous energizable torque at time t14, the inverter continuous energizable torque is output as the post-limitation torque demand value T*' at and after the time 14. With the operation, the inverter continuous energizable torque is set according to the cooling water temperature Tc. Therefore, the post-limitation torque demand value T*' can be made variable according to the cooling water temperature Tc. As a result, the temperature rise in the semiconductor switching element and the like through which the current flows in the inverter circuit 140 is suppressed while the post-limitation torque demand value T*' is reduced as much as possible on the basis of the state of the cooling mechanism, whereby the inverter circuit 140 can be prevented from being in the overheated state When the torque demand value T* falls below the inverter continuous energizable torque at time t15, the torque demand value T* is output without being limited. Further, in this case, since determination condition of the locked state in the motor lock determination processing is not satisfied, the lock determination result D changes from the locked state to the unlocked state, and the torque limitation is canceled.

According to the second embodiment of the present invention described above, the following functions and effects are exhibited.

(1) The motor control unit 100A limits the current to be output from the inverter circuit 140 to the motor 310 on the basis of the state of the cooling mechanism that cools at least the inverter circuit 140 in the case where the motor 310 driven by the inverter circuit 140 is in the locked state. Specifically, the motor control unit 100A includes the current command unit 150 configured to calculate the current command values (Id*, Iq*) for determining the current to be output to the from the inverter circuit 140 on the basis of the input torque command, the motor lock determination unit 170 configured to determine whether the motor 310 is in the locked state on the basis of the motor rotation speed Nrpm indicating the rotation state of the motor 310, and the torque command limitation unit 160 configured to limit the current to be output from the inverter circuit 140 by limiting the torque command on the basis of the cooling water temperature Tc indicating a state of the cooling mechanism in a case where the motor lock determination unit 170 determines that the motor 310 is in the locked state. With the configuration, the current output from the inverter circuit 140 to the motor 310 can be appropriately limited according to the state of the cooling mechanism that cools the inverter circuit 140.

(2) The torque command limitation unit 160 sets the torque limitation value according to the current based on the state of the cooling mechanism and energizable to the inverter circuit 140, that is, the inverter continuous energizable torque, and limits the torque command to the inverter continuous energizable torque or less (step S100A). With the configuration, when the motor 310 is in the locked state, an overheated state of the inverter circuit 140 can be prevented while the energization to the inverter circuit 140 is continued.

(3) The motor lock determination unit 170 determines that the motor 310 is in the locked state (step S26) when the motor rotation speed Nrpm is less than the predetermined value (step S24: Yes) and the torque demand value T* in the torque command exceeds the inverter continuous energizable torque command (step S25A: Yes). With the configuration, when the motor 310 is in the locked state, the locked state can be reliably determined.

(4) The torque command limitation unit 160 sets the protection start inverter temperature on the basis of the inverter temperature Ti when the determination result by the motor lock determination unit 170 changes from the unlocked state to the locked state (step S60A), and limits the torque command to the inverter continuous energizable torque or less (step S100A) when the inverter temperature Ti exceeds the protection start inverter temperature (step S90A: Yes). With the configuration, the torque limitation can be performed at appropriate timing according to the temperature of the inverter circuit 140 at the lock detection time.

Third Embodiment

Figure 15:
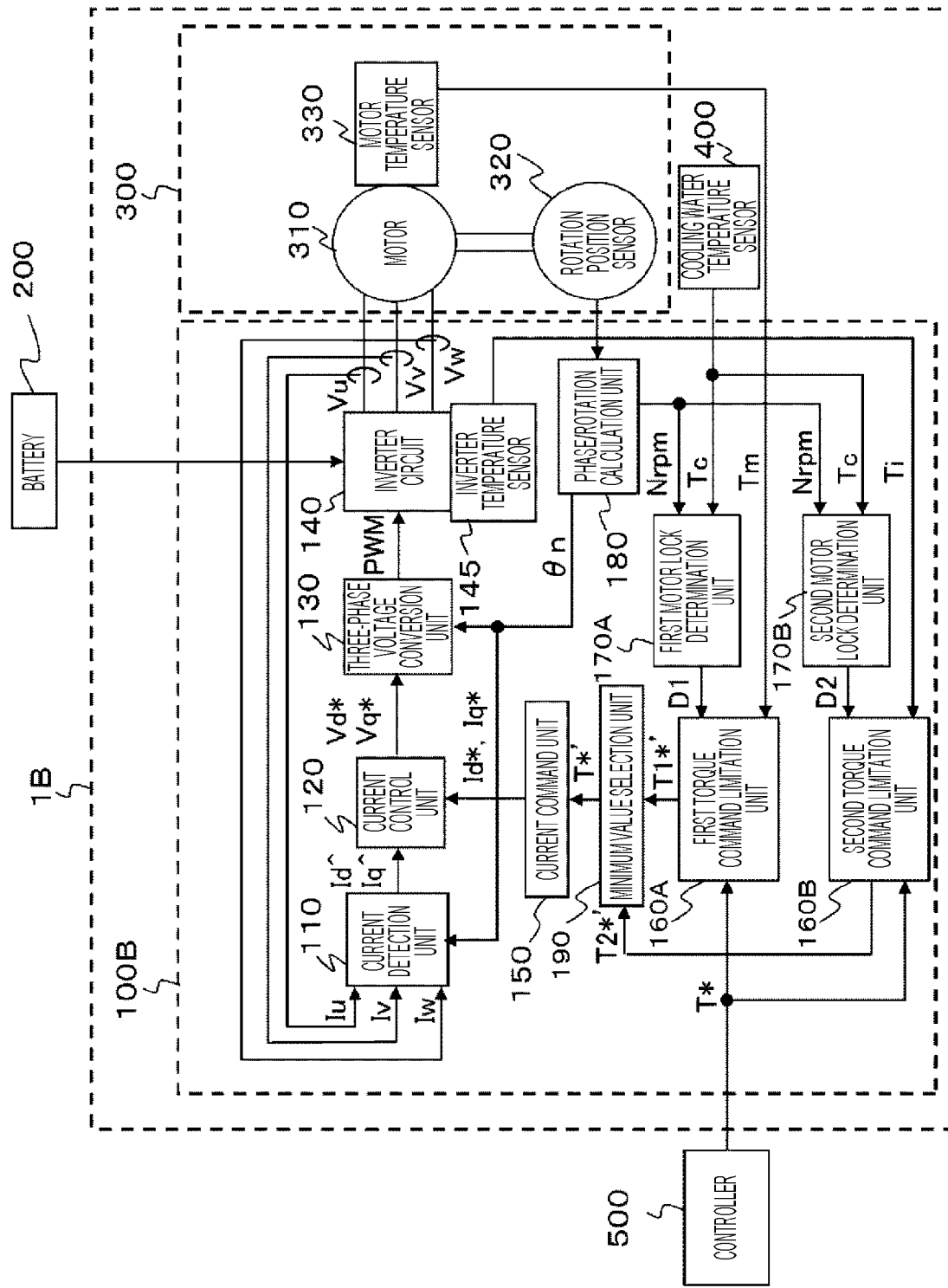
FIG. 15 is a block diagram illustrating an overall configuration of a motor device according to a third embodiment of the present invention.

FIG. 15 is a block diagram illustrating an overall configuration of a motor device 1B according to a third embodiment of the present invention. The motor device 1B includes a motor unit 300 including a motor 310, a motor control unit 100B that drives and controls the motor 310, and a cooling water temperature sensor 400.

The motor control unit 100B includes a first torque command limitation unit 160A and a second torque command limitation unit 160B, and a first motor lock determination unit 170A and a second motor lock determination unit 170B, in place of the torque command limitation unit 160 and the motor lock determination unit 170 in the motor control unit 100 in FIG. 1 described in the first embodiment. Further, the motor control unit 100B includes the inverter temperature sensor 145 described in the second embodiment and a minimum value selection unit 190. Apart from these points, similar configurations to those of the first embodiment are included. Meanwhile, the motor unit 300 has the same configuration as that described in the first embodiment. Hereinafter, the motor device 1B according to the present embodiment will be described focusing on the differences from the first and second embodiments.

In the present embodiment, the motor 310 and the inverter circuit 140 of the motor control unit 100B are respectively cooled by a cooling mechanism (not illustrated) using cooling water so as not to be in the overheated state to energization.

In the present embodiment, the first motor lock determination unit 170A performs motor lock determination processing similar to that described in the first embodiment on the basis of a motor rotation speed Nrpm from a phase rotation calculation unit 180 and a cooling water temperature Tc from a cooling water temperature sensor 400. Then, the first motor lock determination unit 170A outputs an obtained determination result to the first torque command limitation unit 160A as a lock determination result D1. The first torque command limitation unit 160A performs torque limitation processing similar to that described in the first embodiment on the basis of the lock determination result D1 from the first motor lock determination unit 170A and a motor temperature Tm from a motor temperature sensor 330. Then, the first torque command limitation unit 160A outputs an obtained torque demand value to the minimum value selection unit 190 as first post-limitation torque demand value T1*'.

Meanwhile, the second motor lock determination unit 170B performs motor lock determination processing similar to that described in the second embodiment on the basis of the motor rotation speed Nrpm from the phase rotation calculation unit 180 and the cooling water temperature Tc from a cooling water temperature sensor 400. Then, the second motor lock determination unit 170B outputs an obtained determination result to the second torque command limitation unit 160B as a lock determination result D2. The second torque command limitation unit 160B performs torque limitation processing similar to that described in the second embodiment on the basis of the lock determination result D2 from the second motor lock determination unit 170B and the inverter temperature Ti from the inverter temperature sensor 145. Then, the second torque command limitation unit 160B outputs an obtained torque demand value to the minimum value selection unit 190 as a second post-limitation torque demand value T2*'.

The minimum value selection unit 190 compares the first post-limitation torque demand value T1*' with the second post-limitation torque demand value T2*' and selects a smaller one as a post-limitation torque demand value T*' to be actually used for torque limitation. Then, the minimum value selection unit 190 outputs, instead of the torque demand value T*, the selected post-limitation torque demand value T*' to a current command unit 150, thereby limiting a torque command. With the operation, in a case where the motor temperature Tm exceeds a protection start motor temperature and the inverter temperature Ti exceeds a protection start inverter temperature, the post-limitation torque demand value T*' can be made variable according to the cooling water temperature Tc using a smaller one between the motor continuous energizable torque output from the first torque command limitation unit 160A as the first post-limitation torque demand value T1*' and the inverter continuous energizable torque output from the second torque command limitation unit 160B as the second post-limitation torque demand value T2*'. As a result, the temperature rises in the coil and the like through which the current flows in the motor 310 and in the semiconductor switching element and the like through which the current flows in the inverter circuit 140 are both suppressed while the post-limitation torque demand value T*' is reduced as much as possible on the basis of the state of the cooling mechanism, whereby the motor 310 and the inverter circuit 140 can be prevented from being in the overheated state.

According to the above-described third embodiment of the present invention, the cooling mechanism cools the motor 310 and the inverter circuit 140. The first torque command limitation unit 160A sets a first torque limitation value according to a current energizable to the motor 310 on the basis of the state of the cooling mechanism, that is, the motor continuous energizable torque. The second torque command limitation unit 160B sets a second torque limitation value according to a current energizable to the inverter circuit 140 on the basis of the state of the cooling mechanism, that is, the inverter continuous energizable torque. The minimum value selection unit 190 compares the first torque limit value with the second torque limitation value and limits the torque command using a smaller one. With the configuration, when the motor 310 is in the locked state, the overheated state of the motor 310 and the inverter circuit 140 can be prevented while the energization to the motor 310 and the inverter circuit 140 is continued.

Note that, in the above-described first to third embodiments, the water cooling-type cooling mechanism using cooling water has been described as the cooling water for cooling the motor 310 or the inverter circuit 140. However, the present invention is not limited thereto and another cooling mechanism such as an air cooling-type cooling mechanism may be used. Further, as information indicating the state of the cooling mechanism, an example of acquiring the cooling water temperature Tc has been described. However, a wind speed or the like in the air cooling-type cooling mechanism may be acquired as another information. The present invention can be applied to any cooling mechanism as long as the cooling mechanism can cool the motor 310 or the inverter circuit 140 and information indicating the state thereof can be acquired.

Further, in the above-described first to third embodiments, the cooling water temperature Tc as the information indicating the state of the cooling mechanism has been directly acquired from the cooling water temperature sensor 400. However, the cooling water temperature Tc may be indirectly acquired together with the torque command from the controller 500. Further, in the motor device of each embodiment, the current command value may be acquired instead of the torque command from the controller 500. In this case, the motor device applies processing similar to the processing described in the embodiments to the current command value to perform current limitation according to the state of the cooling mechanism, thereby appropriately limiting the current flowing in the motor 310 and the inverter circuit 140.

The above-described embodiments and various modifications are merely examples, and the present invention is not limited to the content of the embodiments and modifications as long as the characteristics of the invention are not impaired. Further, although various embodiments have been described above, the present invention is not limited to the content of these embodiments and modifications. Other aspects conceivable within the technical idea of the present invention are also included within the scope of the present invention.

REFERENCE SIGNS LIST

1, 1A, 1B motor device
100, 100A, 100B motor control unit
110 current detection unit
120 current control unit
130 three-phase voltage conversion unit
140 inverter circuit
145 inverter temperature sensor
150 current command unit
160 torque command limitation unit
160A first torque command limitation unit
160B second torque command limitation unit
170 motor lock determination unit
170A first motor lock determination unit
170B second motor lock determination unit 180 phase rotation calculation unit
190 minimum value selection unit
200 battery
300, 300A motor unit
310 motor
320 rotation position sensor
330 motor temperature sensor
400 cooling water temperature sensor
500 controller

The invention claimed is:

1. A motor control device, comprising:
an input/output device configured to receive a state of a cooling mechanism that cools at least one of a motor and an inverter; and
a motor control unit operatively coupled with the motor and the inverter,
the motor control unit configured to:
limit a current output from the inverter to the motor,
control the current to the inverter on the basis of the state of the cooling mechanism in a case where the motor driven by the inverter is in a locked state,
set a torque limitation value of the motor based on a temperature of cooling water of the cooling mechanism, wherein
on a condition that an absolute value of a torque demand value is greater than the torque limitation value, the motor is determined to be in the locked state, and the motor control unit:
acquires a temperature of the motor,
sets a protection start motor temperature based on the temperature of the motor, and
sets a lock detection-time torque limit value based on the temperature of the motor,
on a condition that the absolute value of the torque demand value is greater than the lock detection-time torque limit value, the motor control unit sets the current to the motor to be equal to or less than the lock detection-time torque limit value, and
on a condition that the absolute value of the torque demand value is less than the lock detection-time torque limit value, the motor control unit determines if the motor temperature is greater than the protection start motor temperature and sets the current to the motor to be equal to the torque limitation value, and wherein
on a condition that the absolute value of a torque demand value is less than the torque limitation value of the motor, the motor is determined to be in an unlocked state and the motor control unit sets a voltage according to the torque demand value applied to the motor.

2. The motor control device according to claim 1, the motor control unit further configured to:
calculate a current command for determining the current on the basis of an input torque command;
determine whether the motor is in the locked state on the basis of a rotation state of the motor; and
limit the current by limiting the torque command on the basis of a state of the cooling mechanism in a case where the motor is determined to be in the locked state.

3. The motor control device according to claim 2, wherein the cooling mechanism cools at least the motor, and
the motor control unit sets the torque limitation value according to a current energizable to the motor based on the state of the cooling mechanism, and limits the torque command to the torque limitation value or less.

4. The motor control device according to claim 3, wherein the motor control unit determines that the motor is in the locked state when a rotation speed of the motor is less than a predetermined value and the torque demand value in the torque command exceeds the torque limitation value.

5. The motor control device according to claim 2, wherein the cooling mechanism cools at least the inverter, and
the motor control unit sets a torque limitation value according to a current energizable to the inverter based on the state of the cooling mechanism, and limits the torque command to the torque limitation value or less.

6. The motor control device according to claim 2, wherein the cooling mechanism cools the motor and the inverter, and
the motor control unit
sets a first torque limitation value according to a current energizable to the motor on the basis of the state of the cooling mechanism,
sets a second torque limitation value according to a current energizable to the inverter on the basis of the state of the cooling mechanism, and
compares the first torque limitation value with the second torque limitation value, and limits the torque command using the smaller torque limitation value.

7. The motor control device according to claim 2, wherein the motor control unit sets a protection start temperature on the basis of a temperature of the motor or the inverter when a determination result changes from an unlocked state to the locked state, and limits the torque command when the temperature of the motor or the inverter exceeds the protection start temperature.

* * * * *